E. B. KEEMER.
SPRING WHEEL.
APPLICATION FILED MAY 18, 1912.

1,053,402.

Patented Feb. 18, 1913.

Witnesses

Inventor
Edgar B. Keemer

Attorney

UNITED STATES PATENT OFFICE.

EDGAR B. KEEMER, OF WASHINGTON, DISTRICT OF COLUMBIA.

SPRING-WHEEL.

1,053,402.

Specification of Letters Patent.   Patented Feb. 18, 1913.

Application filed May 18, 1912.  Serial No. 698,199.

*To all whom it may concern:*

Be it known that I, EDGAR B. KEEMER, a citizen of the United States, residing at Washington, District of Columbia, have invented certain new and useful Improvements in Spring-Wheels, of which the following is a specification.

My invention relates to certain useful improvements in spring vehicle wheels and the objects of the invention are, first, to provide a spring wheel for motor vehicles which possesses sufficient resiliency, durability and simplicity to avoid the necessity of pneumatic or cushion tires on such wheels, and at the same time make the component parts separably connected together so as to be capable of being readily and cheaply manufactured and also be conveniently detached and replaced by new parts when worn out or when occasion requires it. Second, to construct a spring wheel which possesses sufficient flexibility and resiliency, to readily adapt itself to a wide range of loads and at the same time of such stability and strength, as to effectually absorb shocks incident to the different conditions of travel. Third, to provide a spring wheel in which the resilient members are sufficiently rigid as to permit the traction power to readily rotate the wheel without loss of power, or in any way disturb the operative relation of the several parts of the wheel, yet enable, should occasion require, as by shock or otherwise, said shock to be quickly and readily distributed and absorbed by the resilient members of the wheel. Fourth, to construct a spring wheel that embodies to a marked degree, the characteristics of simplicity, durability, and strength, combined with a maximum resiliency, without any unusual weight to the several parts of the wheel.

With these and other objects in view that will more fully appear from the detailed description hereinafter referred to, the invention consists in structural features and relative arrangements of the several parts comprising the invention, which will be hereinafter more fully described and particularly pointed out in the appended claims.

For a full understanding of the invention and merits thereof and also to acquire the details of the construction, reference is to be had to the following description and accompanying drawings, in which—

Figure 1:
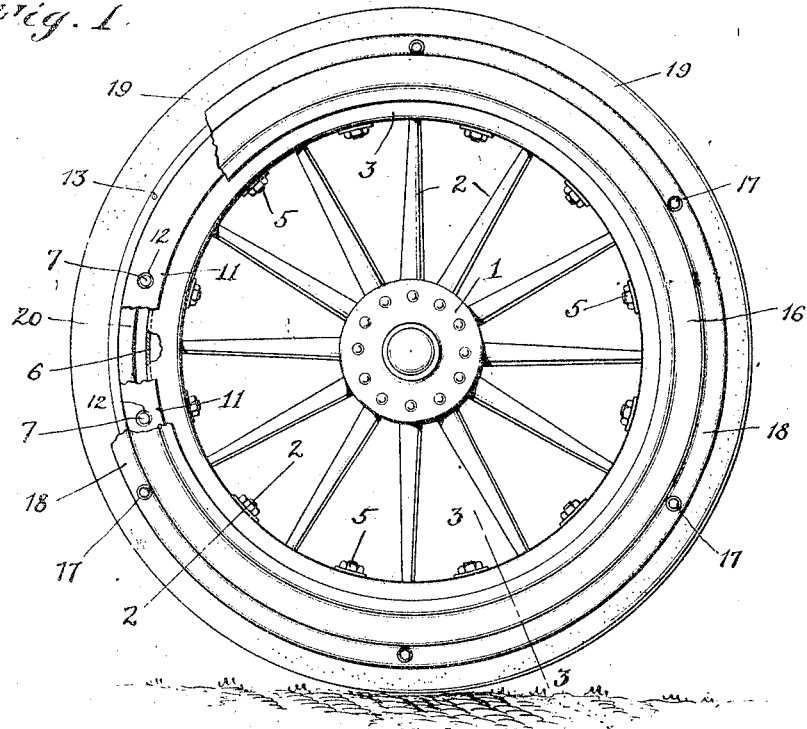
Figure 2:
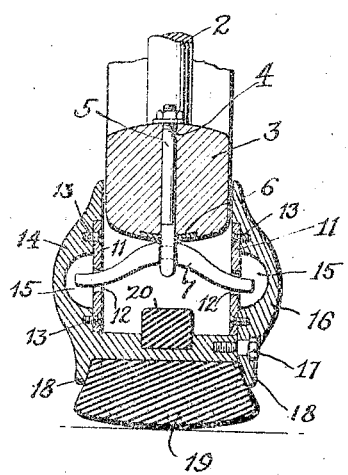
Figure 3:
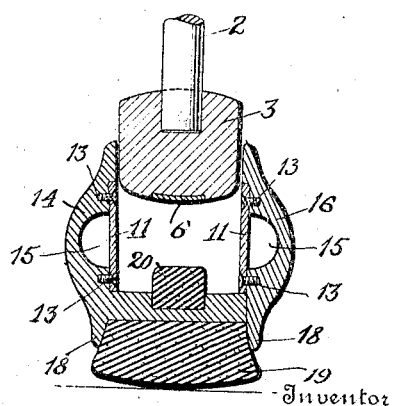
Figure 4:
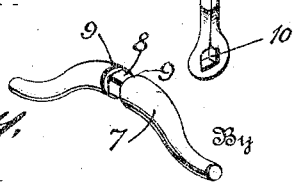

Figure 1 is a side elevation of the wheel with a section broken away; Fig. 2 is a section on the line 2—2 of Fig. 1; Fig. 3 is a section on the line 3—3 of Fig. 1; and Fig. 4 is a detail view of one of the resilient members, and attaching bolts.

In the drawings, the same reference characters indicate the corresponding and like parts in the several views.

For the purpose of illustrating one and the preferred form of my invention in the drawings, 1 represents the hub of the wheel and 2 are the spokes which engage and support in proper relation the felly 3. Said felly 3 is provided with a series of radial holes 4, preferably interposed between the spokes 2, 2, and are adapted to receive split bolts 5, to be hereinafter more particularly described. The central section of the periphery of the felly 3 over the holes 4, is provided with a reinforcing annular band 6, for the purpose of strengthening and holding together the felly 3 and spokes 2, and at the same time providing a firm support for the resilient members or springs 7. The resilient members or springs 7, are preferably bowed bars, which are circular in cross-section and tapered from the middle toward each end, the middle section being irregular in cross-section at 8 and provided with shoulders 9, 9, as shown in Fig. 4. The series of resilient members or springs 7, are arranged transversely to the plane of the wheel and are firmly and rigidly held to the periphery, one spring at each hole 4, by means of the split bolts 5, said bolts 5 being provided with an opening 10 at their outer ends corresponding to and firmly engaging the irregular cross-section at 8, of the springs 7. On each side of the felly 3, is arranged an annular plate 11, having a series of holes 12, 12, so arranged as to be in proper relation to permit the plates 11, 11 to loosely pass over and rest on the outer ends of the springs 7, as shown in Fig. 2.

Secured to one of the plates 11 by screws 13, or otherwise, is a cover 14, preferably L-shaped in cross-section and provided with an annular pocket 15, to receive and permit any outer movement of the ends of the springs 7. The other plate 11 is also provided with and has similarly secured thereto a cover 16, by screws 13, said cover 16 being firmly attached to the cover 14 by means of any suitable securing bolts or screws 17. Said cover 16 is also provided with a similar pocket 15 for the same purpose as described with reference to cover 14, and both covers 14, and 16, slidingly engage the sides of the felly and are provided with a flange 18, to engage and suitably retain any form of cushion tire 19.

The numeral 20 indicates a cushion secured to the inner wall of the cover 14, and directly below the springs 7 and bolts 5, to resist the downward movement of the springs 7, should they for any reason receive an unusual shock, and pass below their points of support.

The manner of assembling the wheel is as follows: The cover 14 with its plate 11 is placed in a horizontal position. The hub, spokes, and felly with its springs securely fastened thereto, are now positioned so that the ends of the series of springs 7 pass into the corresponding series of holes 12 of the plate 11, attached to the cover 14. The other plate 11 with its attached cover 16, is now placed so that the series of holes 12 in the last mentioned plate 11 register with and engage the other ends of the springs 7. After the plates 11 with their covers 14 and 16 are properly adjusted, so that there is no binding between the ends of the springs 7 and plates 11, the cover 16 is firmly secured to the lower extension of the cover 14 by means of screws 17. The tire 19 can be secured to the cover 14 or wheel at any time desired.

From the above described construction of the several parts and the mode of assembing the same, it will be seen that during the running of a vehicle provided with wheels constructed according to my invention, any shock received by the tire of the wheel will force the members or covers 14 and 16 with their connected plates 11, in an upward direction and cause the said covers to slide along the outer sides and over the felly 3. This upward movement of the covers 14 and 16 with their connected parts will be resisted by all of the flexible bars and springs 7 and since each bar is held or supported by the felly 3 and covers 14 and 16, and each bar being circular in cross-section, said springs will bend in any direction, and hence the vibration of the shock will be readily absorbed by these springs. Furthermore, the construction of the bar springs circular in cross-section instead of flat bars, and having their extremities supported in circular openings, makes it possible for each and every spring to take up its share of absorbing the shock and also prevents any rotary movement or tendency of the covers 14 and 16 to creep around the felly 3.

It will be distinctly understood that any changes which may suggest themselves to those skilled in the art, and coming within the spirit of the appended claims, will not be considered as departing from the scope of my herein described invention.

What I claim is:—

1. A spring wheel comprising a felly provided with a series of spaced radial holes, a series of curved springs arranged transversely to the plane of the wheel and in contact with the periphery of the felly at each hole, the ends of the springs extending outwardly and from the center of the wheel, bolts passing through said holes and connected with the springs, an annular plate on each side of the felly having a series of holes registering with and loosely engaging the ends of the transverse springs, said plates supported or carried by said springs and a circular rim engaging and carried by each of said annular plates.

2. A spring wheel comprising a felly provided with a series of spaced radial holes, a series of curved springs arranged transversely to the plane of the wheel and in contact with the periphery of the felly at each hole, the ends of the springs extending outwardly and from the center of the wheel, split bolts passing through said holes and having their outer ends surrounding the middle section of the springs, an annular plate on each side of the felly having a series of holes registering with and loosely engaging the ends of the transverse springs, and a circular rim engaging and carried by each of said annular plates.

3. A spring wheel comprising a felly provided with a series of spaced radial holes, a series of curved round bars arranged transversely to the plane of the wheel and in contact with the periphery of the felly at each hole, the middle portion of said bars being irregular in cross-section and the ends of the springs extending outwardly and from the center of the wheel, split bolts passing through said holes and having their outer ends surrounding and engaging the irregular section of the bars, an annular plate on each side of the felly having a series of holes registering with and loosely engaging the ends of the transverse bars, and a circular rim engaging and carried by each of said annular plates.

4. A spring wheel comprising a felly provided with a series of spaced radial holes, a series of curved springs circular in cross section arranged transversely to the plane of the wheel and in contact with the periphery of the felly at each hole, the ends of the springs extending outwardly and from the center of the wheel, bolts passing through said holes and connected with the springs, an annular plate on each side of the felly having a series of holes registering with and engaging the ends of the transverse springs, said plates supported and carried by said springs, an annular cover secured to the outside of each plate and protecting the movable ends of the springs, and a circular rim engaging and carried by each of said annular plates.

5. A spring wheel comprising a felly provided with a series of spaced radial holes, a series of curved springs arranged transversely to the plane of the wheel and in contact with the periphery of the felly at each hole, the ends of the springs extending outwardly and from the center of the wheel, bolts passing through said holes and connected with the springs, an annular plate on each side of the felly having a series of holes registering with and engaging the ends of the transverse springs, an annular cover provided with an inner circular pocket secured to the outside of each plate and protecting the movable ends of the springs, and a circular rim engaging and carried by each of said annular plates.

In testimony whereof I affix my signature in presence of two witnesses.

EDGAR B. KEEMER.

Witnesses:
W. E. SCHOENBORN,
H. P. ROBERTS.